Sept. 1, 1931.  F. M. CARROLL  1,821,089
SELECTIVE COLUMN TABULATING MACHINE
Filed Aug. 13, 1927   5 Sheets-Sheet 1

Sept. 1, 1931. F. M. CARROLL 1,821,089
SELECTIVE COLUMN TABULATING MACHINE
Filed Aug. 13, 1927   5 Sheets-Sheet 3

Inventor
Fred M. Carroll
By his Attorney
W. M. Wilson

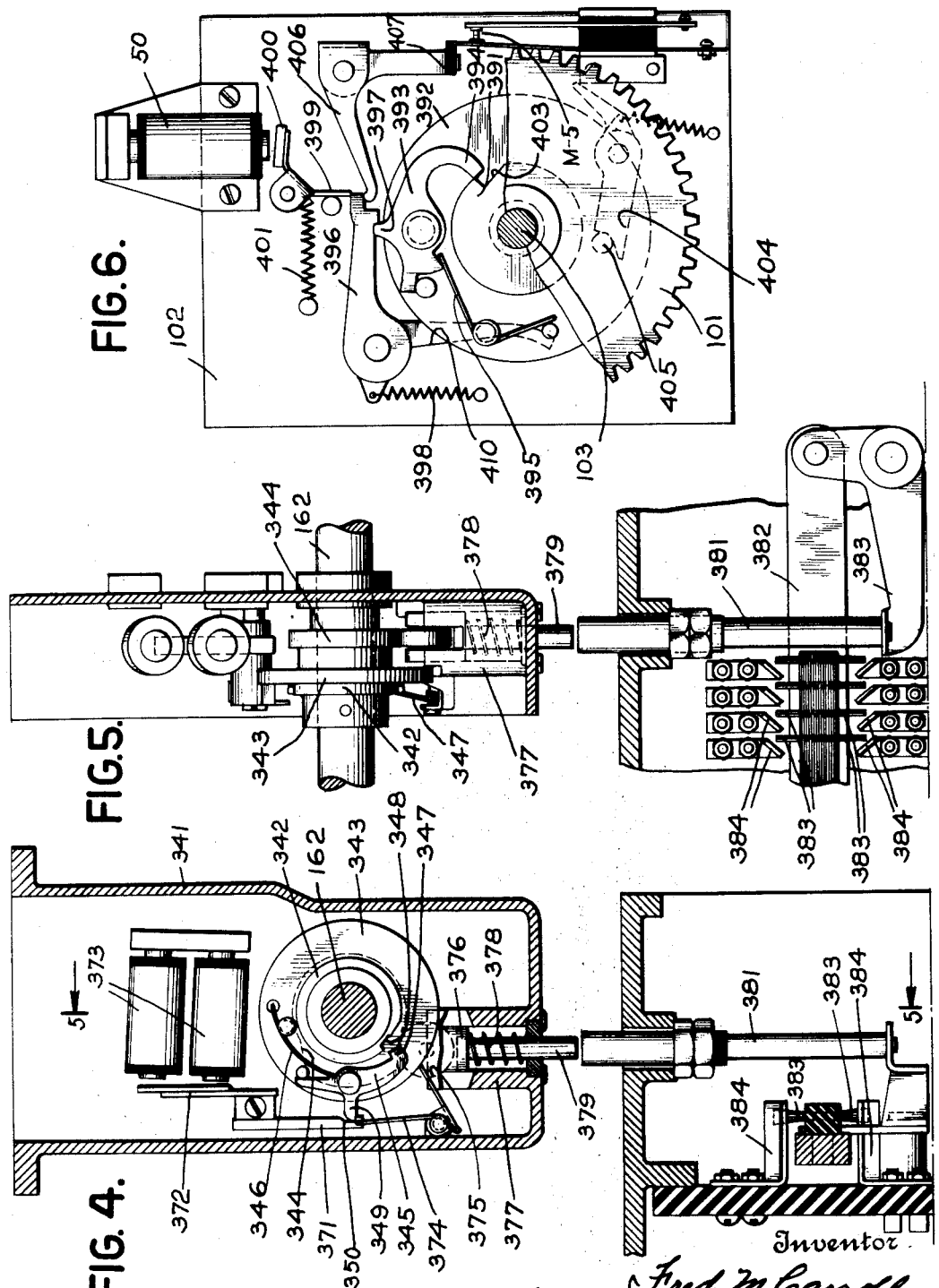
Sept. 1, 1931.   F. M. CARROLL   1,821,089
SELECTIVE COLUMN TABULATING MACHINE
Filed Aug. 13, 1927   5 Sheets-Sheet 4
Inventor
Fred M. Carroll
By his Attorney
W. M. Wilson Sept. 1, 1931.  F. M. CARROLL  1,821,089
SELECTIVE COLUMN TABULATING MACHINE
Filed Aug. 13, 1927    5 Sheets-Sheet 5
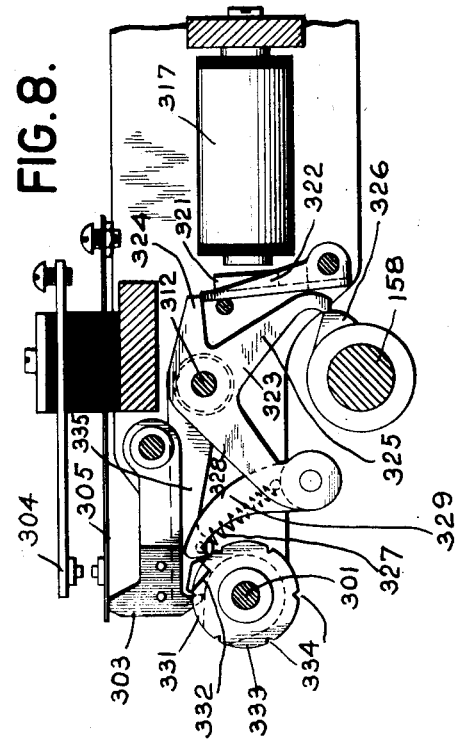
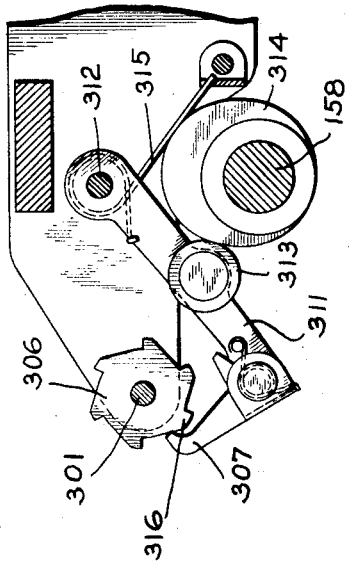
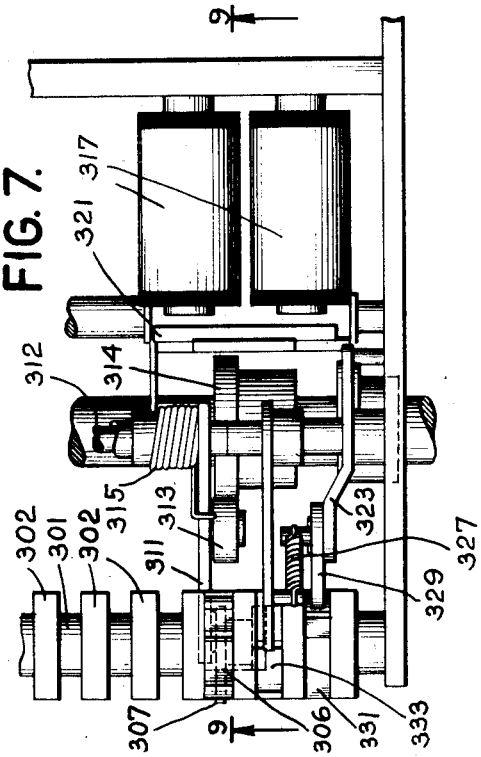
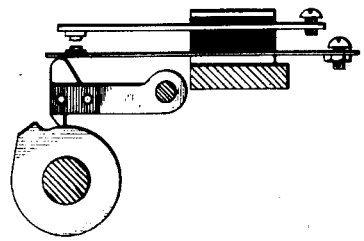
Inventor
Fred M. Carroll
By his Attorney
W. M. Wilson Patented Sept. 1, 1931

1,821,089

UNITED STATES PATENT OFFICE

FRED M. CARROLL, OF YONKERS, NEW YORK, ASSIGNOR TO THE TABULATING MACHINE COMPANY, OF ENDICOTT, NEW YORK, A CORPORATION OF NEW JERSEY

SELECTIVE COLUMN TABULATING MACHINE

Application filed August 13, 1927. Serial No. 212,690.

The present invention refers to record controlled tabulating machines and particularly to such machines in which data recorded by index points in different record fields may be entered into the same accumulator.

It is sometimes desirable in tabulating machine accounting practice to designate items of different classes in separate record fields and add the data from the several fields into the same accumulator. Ordinarily when this is done each record card has an item entered in only one of the fields in question and the purpose of the present invention is to selectively connect the analyzing devices of the machine associated with the field in which the entry occurs with the accumulator. Furthermore, since only one of the card fields in question contains data designating index points or perforations the present invention contemplates using the data designating perforations themselves to govern the selective connection of the accumulator with the analyzing mechanism.

The accounting features will be clearer from a specific example. It may be considered that an insurance company, for example, desires data on the amount of increase of a certain kind of insurance which is in force. New insurance may be entered in one record field and claims paid in this particular kind of insurance may be entered as complements in another field. The items are thus substantially debit and credit items and an adding operation of all items on a single accumulator will result in a figure representing the increase in the amount of that particular kind of insurance during the period covered by the tabulator card file.

The preferred form of the invention comprises an electrical tabulator provided with upper and lower brushes, the lower brushes analyzing each record card exactly one cycle later than it is analyzed by the upper brushes. In addition to their usual controlling features the upper brushes also govern selecting mechanism for connecting the accumulator to the lower brushes cooperating with that record field in which the entry occurs. A switch bar is provided for each record field with a plurality of normally open contacts, which when closed connect the lower brushes coacting with that field to the accumulating elements. Each of these switch bars is controlled by a magnet which when energized during one machine cycle, causes the bar to move to circuit closing position during the adding portion of the following machine cycle. As each record car passes the upper brushes, then, the upper brushes which encounter any perforations in their respective fields effect operation of the selective switch bar associated with that field and the entry is properly made into the accumulator as the card passes the lower brushes.

The invention will be more clearly understood from the following detailed description which should be read in connection with the accompanying drawings in which Fig. 1 is a circuit diagram of a machine according to the invention;

Figs. 4 and 5 are sectional views at right angles to each other showing the switch bar operating mechanisms hereinafter referred to as jacks;

Fig. 6 is a detail of the card feed clutch;

Figs. 7, 8 and 9 are detailed illustrations of the electric timers and

Fig. 10 is a detail of a cam operated contact assembly.

Figure 1:
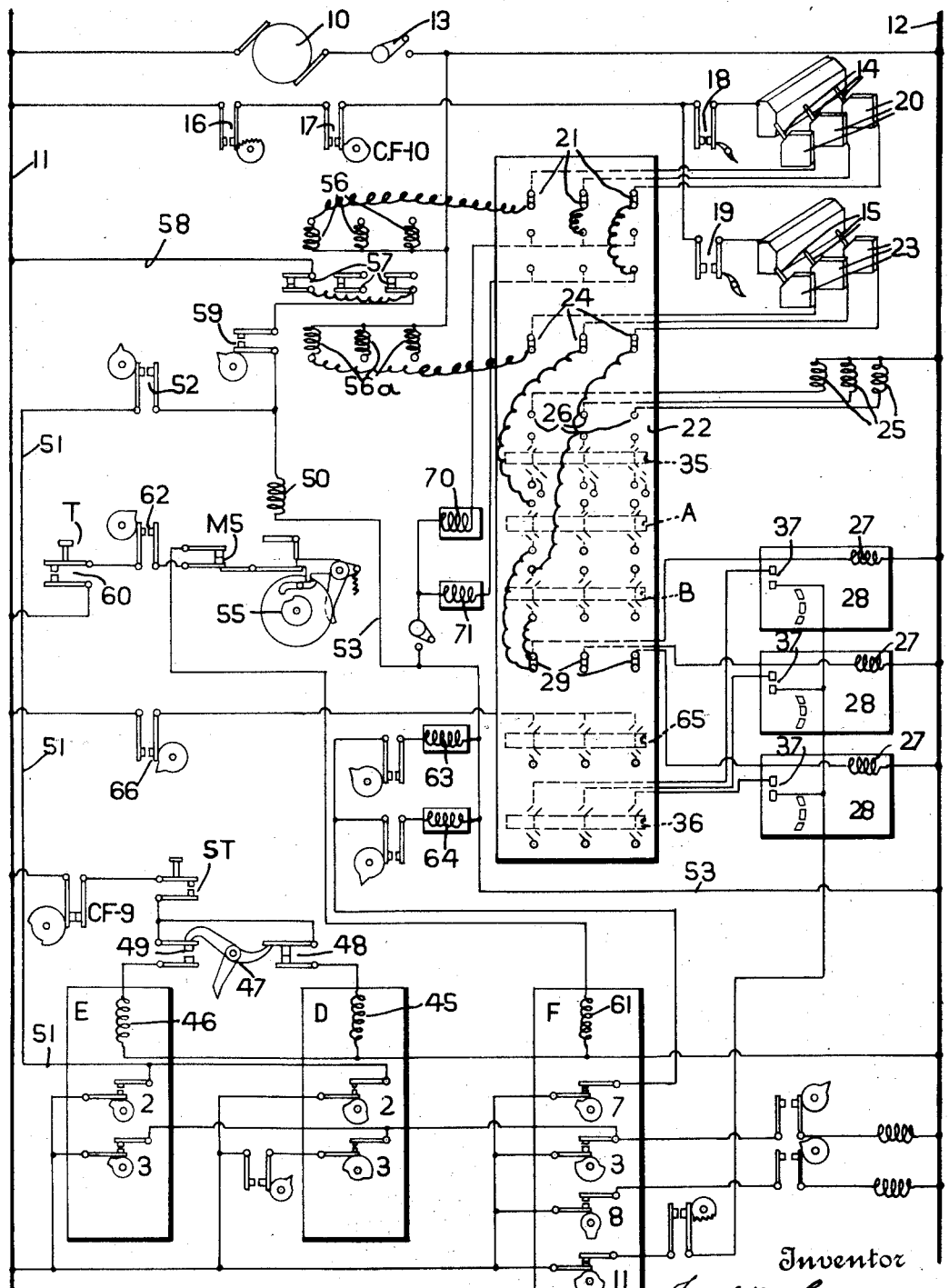

The circuit diagram shown in the drawings, except for the new features which will be distinctly pointed out, is a simplified version of that shown in my copending application, Serial No. 147,960, filed November 12, 1926 (now Patent No. 1,750,459) to which reference may be had for a detailed explanation of the mechanical features and a full and complete explanation of the electrical operation of the machine. These features in the present case will be described only in sufficient detail to bring out clearly the operation of the new features which are embodied in the present improvement.

Figure 2:
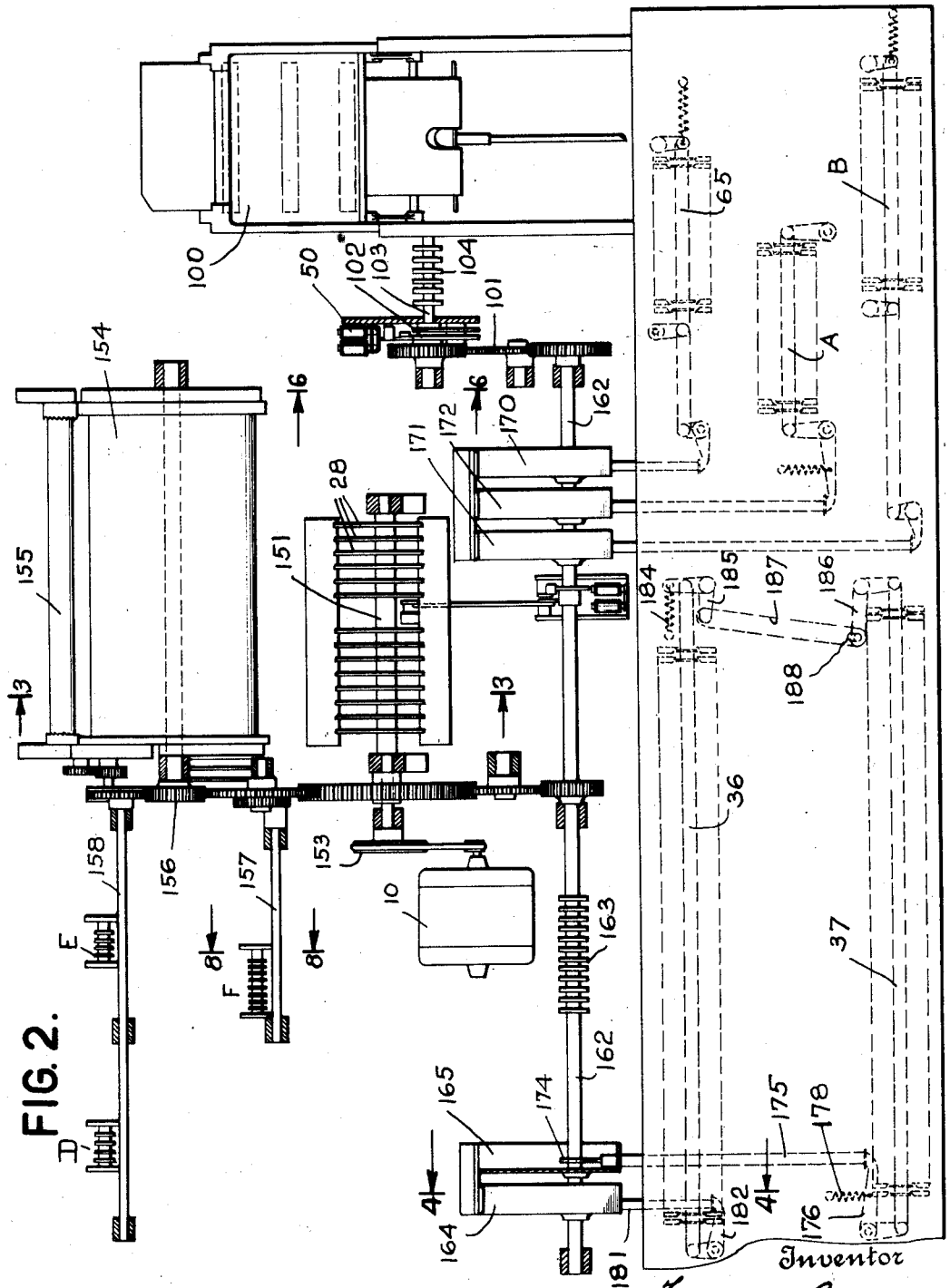
Fig. 2 is a diagrammatic arrangement of the entire machine assembly, the supporting structure being omitted for the sake of clearness.

A general idea of the machine operation may be best obtained from Fig. 2 which, although schematic in form, shows the essential elements for a completely operative machine properly coordinated. The motive power for driving the machine is furnished by an electric motor 10 which drives all the operating shafts through suitable gear trains. The tabulator shaft 151 is operatively connected to the accumulator units 28 and is driven through a gear train and pulley 153 by the motor. The printing drum 154 and platen 155 together with the necessary paper feed mechanism (not shown) are driven through a gear train indicated generally at 156 and an extension of this train operates the shafts 157 and 158 on which are mounted the rotatable parts of the automatic timers indicated at D, E and F. The motor, through another branch of the gear train 156, constantly rotates a shaft 162 on which are rigidly fastened the cams of the regular cam contacts 163 and the cams of the switch bar controlling jacks 164, 165, 170, 171 and 172. The regular cam contacts 163 are of the type usually adopted in machines of this type as illustrated typically in Fig. 10 and consist of spring contacts opened and closed by their associated cams at predetermined points in every machine cycle.

The jacks 164, 165 and 170 to 172 which will be described in detail hereinafter, each consists of a cam for depressing a rod during machine operation which, through a suitable bell crank, shifts a switch bar carrying a plurality of control contacts into and out of circuit closing position. The jack 165, which is shown partly in section, has a cam 174 which in the home or D position of the machine depresses a rod 175 rocking a bell crank 176 against the action of its biasing spring 178 and holding the switch bar 37 to the left which is its open circuit position. When the machine is in operation the low portion of the cam 174 permits the rod 175 to rise and the spring 174 rocks its bell crank counterclockwise and shifts the bar 37 to the right into closed circuit position. The bar 37, which is the adding and listing switch bar is operated in every machine cycle in which there is no totalling and is permitted to remain in circuit closing position during that portion of the machine cycle in which the analyzing brushes are searching the entire active index point area of the controlling card.

The remaining jacks are similar to jack 165 in that they have a cam for depressing a rod to shift a switch bar but they differ from it in that they are not active in every machine cycle. During the cycles in which they are inactive a locking magnet holds their operating rod depressed so that the cams are ineffective. The jack 164 through its rod 181 and bell crank 182 controls the total printing switch bar 36 which is biased to open circuit position by the spring 184. An interlocking mechanism is provided between the switch bars 37 and 36, as with the particular circuit arrangement adopted, it is essential that the adding and listing bar be held in open circuit position whenever the total printing bar is in closed circuit position. This interlocking system consists of the bell cranks 185 and 186, pivotally connected to the bars 36 and 37, respectively, and the link 187 joining the two bell cranks. When the bar 36 is shifted to the right, into circuit closing position, the bell crank 185 rocks clockwise and holds the bar 37 to the left or in open circuit position. Thus in spite of the rotation of the cam 174, the bar 37 cannot close its circuits as long as the switch bar 36 is in circuit closing position. Interference between the normal operation of the bar 37 and the interlocking mechanism is prevented by a pin and slot connection at 188 which permits the bar 37 to be freely operated by its jack as long as the bar 36 remains in open circuit position. The operation of the total taking switch bar 65 and the special switch bars A and B is substantially similar to that of the switch bar 36 except that no interlocking mechanism is required.

The card feed mechanism indicated generally at 100 is of the type usually employed in machines of this character and needs no detailed description. It is driven from the shaft 162 through a gear train 101, the last gear of the train being connected to the card feed shaft 103 through a one revolution clutch 102. The card feed cams 104, whose function is to control the opening and closing of control contacts during card feeding cycles and whose typical form is shown in Fig. 10, are fixed to the card feed shaft 103.

The mechanical and electrical details of the several new elements of the machine will first be described and then the complete operation of the machine explained in connection with the circuit diagram.

Figure 3:
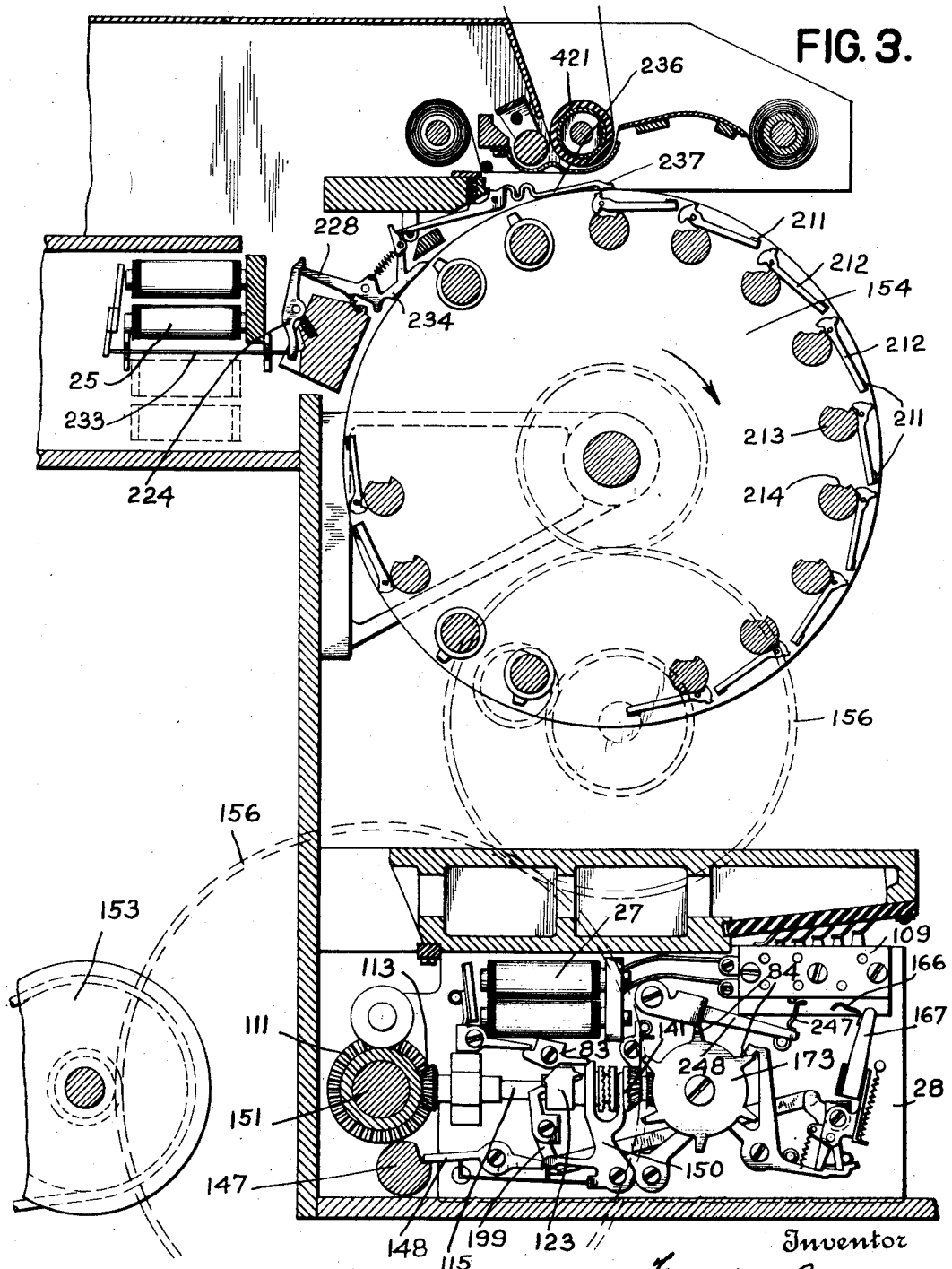
Fig. 3 is a section on line 3—3 of Fig. 2 showing the printing and accumulating mechanism.

The tabulating shaft 151 as shown in Fig. 2 is constantly rotated by the motor 10 as long as the latter is in operation. This shaft 151 (see Fig. 3) has bevel gears 111, one for each accumulator unit, mounted thereon in position to engage the individual driving pinions 113 of the accumulator units. The driving pinion 113 is fixed on a shaft 115 which thus rotates as long as the motor is in operation. A sleeve 123 fixed to shaft 115 is provided with clutch teeth on its end which cooperate with clutch teeth on a slidable sleeve 141 free on shaft 115. The sleeve 141 constitutes the counter element of the accumulator. A spring operated shifting fork 150 normally tends to force the teeth on sleeve 141 into engagement with those on sleeve 123 but this action is normally restrained by a spring actuated latch 83 which engages an extension on shifting fork 150. This latch may be released by momentary energization of counter magnet 27 which attracts its armature 152 and by means of an extension on the pivoted support of the latter trips latch 83 and permits shifting fork 150 to shift sleeve 141 into clutching engagement with sleeve 123. Sleeve 141 thereupon rotates with shaft 115 until a predetermined point in the machine cycle when a cam extension on sleeve 123 rocks lever 199 which shifts fork 150 back to its normal position permitting latch 83 to again engage it. This effects an entry on the counter element or sleeve 141 corresponding to the time of energization of counter magnet 27. The times of energization are of course governed by the location of index points on controlling records in the well known manner.

Total printing is effected by energizing counter magnet 27 to cause the counter elements 141 to rotate to home position. The counter elements through suitable crown gearing drive disks 173 which are provided with extending fingers 84 which are so spaced that the disk moves the distance between adjacent ones when ten is entered on the counter element. Just before the counter element reaches home or zero position one of these fingers rocks a lever 248 forcing a contact 247 on the end thereof into engagement with suitable totaling contacts in contact block 109. The inertia of parts and the wiping contact causes this circuit to persist until the counter element actually reaches zero position at which time the total printing impulse is transmitted to effect printing of the total.

The printing mechanism comprises a drum 154 rotated as aforesaid by the motor 10 and carrying pivoted type bars 212 adjacent its periphery. Through suitable gear trains (not shown) and rotating cams 213 these type bars are locked when out of printing position but each one as it arrives opposite platen 421 is released owing to depressions 214 in cams 213. At this time printing from the particular type 211 may be effected by energizing printer magnet 25. The magnet attracts its armature and pushes rod 233 to the right thereby releasing latch 224 which normally holds a spring pressed pivoted member 234 inoperative. On release of member 228 it rotates slightly clockwise and a dog on an extension of it snaps under the end of a pivoted type selecting finger 236. Shortly thereafter an extension on a locked type bar 212, behind that which is to print, encounters member 228 and rocks it counterclockwise thereby lowering the forward hooked end 237 of type selecting finger 236 and locating this hooked end in the path of extensions on the type bars. When the type bar which is to print arrives opposite the platen the hook encounters its extension and due to the inertia of the moving parts the type bar is rotated sharply about its pivot and delivers a blow to the platen 421 thereby printing on a suitable paper strip.

It is the usual practice in machines of this type to control each machine cycle by control devices which are rendered operable either during the cycle itself or the one immediately preceding it; that is, all conditioning operations must take place not more than one cycle ahead of the operations for which they condition. If it so happens that the control cards have just been placed in the magazine it is necessary for the machine to operate through at least two cycles to feed the first card under the lower brushes before the machine will operate automatically. This is usually done by successive manual closings of the start key to separately initiate at least two machine cycles. This inconvenience has been obviated by providing timers for automatically controlling the machine through a plurality of successive cycles at the beginning of each type of operation. The timers govern the control circuits independently of any of the ordinary control devices of the machine and when once set in operation will properly control the machine until all conditions necessary to full automatic control are established. It is possible by merely pressing the start key once to set the timer in operation and the machine will then operate automatically regardless of the position of the control records with respect to the brushes. It has been found that timer control for six cycles will satisfy any condition which may arise at present in the machines and for the purpose of standardizing the timers all of them have been designed for six cycle operation, even though in some cases less than six cycles might be sufficient. It is understood, however, that the principle of timer control could be applied for any number of cycles either more or less than six.

The principle of operation of the timers consists in rotating a shaft once during the number of machine cycles for which the timer is to be in operation. In the present case this shaft will rotate once in six cycles of machine operation. The shaft through suitable cams closes contacts which obviously may remain closed during any of the six cycles of operation. The contacts are connected with the usual control circuits of the machine and control the closing of these circuits independently of the usual automatic control system. The timers are indicated generally at D, E and F in Fig. 2 and are associated with the shafts 157 and 158 which are driven constantly by the gear train 156 as long as the motor 10 is in operation. The timers D and E are the starting timers and F is the total timer. The number of cams and contacts on these timers are different but their operation is substantially similar and a description of one will suffice for all, it being understood that the necessary changes must be made in the number of contacts and number and shape of the cams to adapt them to their different functions.

One of these timers is shown in detail in Figs. 7, 8 and 9. The timer shaft is shown at 301 (Fig. 7) carrying suitably shaped cams 302 which cooperate with pivoted levers 303 (Fig. 8) and cause them to open and close control contacts 304, 305 as required. The driving mechanism for the timer shaft 301 is shown most clearly in Fig. 9. The shaft 301 is driven by a ratchet wheel 306, rigidly attached to it, and a pawl 307. The pawl is mounted on a lever 311 freely supported on a shaft 312 and urged counterclockwise by spring 315. The lever 311 carries a roller or cam follower 313 which under the force of spring 315 is pressed against the surface of a cam disk 314 fast to the shaft 158. The shaft 158 as will be seen from Fig. 2, makes one revolution for each machine cycle and once each revolution lever 311 will be rocked by the cam. The ratchet wheel 306 is provided with six ratchet teeth and under operating conditions will be advanced the space of one tooth for each revolution of the shaft 158. In other words when the timer is started its shaft 301 will rotate once for six machine cycles. One of the ratchet teeth designated as 316 is longer than the others and the movement of the pawl 307 is not sufficient to permit it to slide off this tooth and engage the next one. As long as the timer shaft remains in the position shown in the drawings the pawl 307 merely rides up and down on the surface of this elongated tooth.

The operation of the timer is initiated by energizing the magnet 317 (Fig. 8) which thereupon attracts its armature 321 and rocks a latch lever 322 attached thereto from its latching position beneath the arm 324 of a lever 323 freely supported on the shaft 312. The lever 323 has a second arm 325 whose end extends into proximity to a cam 326 rigidly mounted on the shaft 158. The arm is ordinarily held out of the path of this cam by the latch 322. A third arm 328 on the lever 323 carries a pivoted pawl 329 and also is attached to the spring 327 tending to rotate the lever about its pivot. The pawl 329 co-acts with a notch 332 in a disc 331 rigidly mounted on the timer shaft. When the lever 323 is in latched position as in Fig. 8 the nose of pawl 327 rests on the brink of notch 332. Energization of the magnet 317, by rocking the latch lever 322, releases the lever 323 and as soon as the cam 326 clears the end of the arm 325 the lever is rocked by the spring 327 and the pawl 329 engages the notch 322. The cam 326 in its next rotation strikes the end of arm 325 and rocks the lever 323 against the force of spring 327, thus imparting a slight rotation to the notched disc 332 and the attached timer shaft 301. The lever 323 is relatched by the latch 322 as the starter magnet 317 has now been deenergized and the position of the starting mechanism is again as shown in Fig. 8. The slight rotation of the timer shaft 301 causes the pawl 307 (Fig. 9) to slip off the surface of the elongated tooth and engage the next tooth of the ratchet 306 whereupon the rocking of the lever 311 by the cam 314 will rotate the timer shaft 301 for one-sixth of a revolution on the pawl 307 engaging each tooth of the ratchet 306. At the end of six cycles or revolutions of the shaft 58 the pawl 307 will again engage the surface of the elongated tooth and as the starting pulse is not supplied at this time it will again ride back and forth on the surface of the tooth 316. The movement of the timer shaft is not an even rotational movement but a series of steps each of which carries the shaft rather quickly through a sixth of a revolution and allows it to remain stationary until the early part of the next machine cycle. The shaft is releasably held at the end of each step by an impositive lock consisting of a latch 335 which engages suitably spaced notches 334 in a disc 333 fixed to the timer shaft. The energization of the magnet 317 then has caused the timer shaft to move from its home position through a single revolution back to its home position during six cycles of machine operation. It may be stated however, that the six steps of cycles of timer operation need not coincide with the usual machine cycles as the point in the machine cycle in which timer operation is initiated may be chosen when most convenient.

The cams 302 are suitably shaped with respect to the particular timer in which they are assembled and the function which it is to perform to control the operating circuits of the machine. After the timer has run out its six cycles and has come to rest in its normal position timer contacts 304 and 305 are inoperative until the magnet 317 is again energized to institute another timer operation.

The construction and operation of the starting timers and the totaling timer are very similar but their effect is entirely different. The starting timers are merely to set the machine in operation regardless of the position of the record cards with respect to the analyzing brushes and to control the machine for a sufficient number of cycles to permit the necessary setups of the usual machine control system. The totaling timer selects certain cycles for printing without reset of the accumulator counters and other cycles for printing and restoring the accumulator. These different functions result merely from the shape of the cams and the arrangement of the controlling circuits which will be described in detail in connection with the general operation The operation of the magnetically controlled switch bars 36, 65, A and B, whose function is to automatically connect the several operating units with the control units as required by machine operation is illustrated in Figs. 4 and 5 which shows a typical one of them.

Referring now to Figs. 4 and 5 the switchbar is controlled by a jack comprising a casing 341 through which the shaft 162 driven by the gear train 156 (Fig. 2) extends. Fixed to the shaft 162 within the confines of the casing is a disc 342 provided with a notch 348. This disc, of course, turns constantly with shaft 162. Loosely mounted on the shaft 162 is a structure consisting of a disc 343, larger in diameter than the disc 342, and a cam 344. Discs 342 and 343 constitute a one revolution clutch substantially similar to those well known in the art. Pivoted on the disc 343 is a dog 345 having a projection 347 adapted to engage in the notch 348 and constantly urged to engaging position by a spring 346. This engagement is normally prevented by an arm 349 on the dog which extends into a notch 350 formed in a pivoted latch member 371 biased to latching position by a spring 374. The latch member 371 also carries the armature 372 of magnet 373. If the magnet 373 is energized instantaneously it will attract its armature and release the latch mechanism permitting the extension on the dog to engage in the notch 348, whereupon the disk 343 and cam 344 will rotate with disk 342 and shaft 162. These parts will only rotate a single revolution as when they return to their initial position the arm 349 reengages in the notch 350, the latch lever 371 now being released by the magnet, and the dog 345 will be rocked out of engagement with the disc 342. The cam 344 actuates a cam follower 375 rotatably supported between upwardly extending ears of a cylindrical member 376 adapted to reciprocate in a guide formed by an inwardly extending flange 377 of the casing 341. The member 376 with the cam follower is normally urged upwardly by a spring 378 surrounding a shank 379 integral with member 376. As the cam 344 rotates it depresses the member 376 through the cam follower 375 and the shank 379 forces the operating rod 381 of the switchbar downwardly. When the low portion of the cam is presented to the cam follower 375, member 376 and its shank will rise under the action of the spring 378. The operating rod 381 is connected at its lower end to a bell crank 383 whose opposite end is pivotally connected to the switchbar 382. A suitable spring (not shown in Figs. 4 and 5 but illustrated diagrammatically in connection with the switchbar in Fig. 2) tends to rock the bell crank 383 clockwise causing the rod 381 to follow the movements of the shank 379. A plurality of bridging contacts 383 are mounted on this switchbar 382 and insulated from it and from each other. When the rod 381 is depressed these bridging contacts are forced into engagement with stationary contacts 384 and remain there until the rod 381 rises whereupon they will be returned to normal non-bridging position. The lower contacts 384 may be connected with the control circuits and the upper contacts may be connected to the control devices, thus providing for positively disconnecting the control devices from their circuits whenever their operation is not required.

The card feed clutch shown diagrammatically at 102 in Fig. 2 and detailed in Fig. 6 is of the usual type of one revolution clutch, well known in the art, but embodies some unusual structural features to adapt it to the operation of the present machine. The last gear wheel of the train 101 is freely supported on the card feed shaft 103 and has a notched disc 391 rigidly attached to it. The rotation of the gear wheel and disc does not ordinarily cause rotation of the card feed shaft. Fixed to this shaft is a disc 392 carrying a pivoted dog 393 overlying the disc 391 and having a nose portion 394 normally urged by a spring 395 into engagement with a notch 403 therein. The dog is prevented from engaging in the notch by a latch mechanism consisting of a pivoted latch lever 396 having an extension adapted to engage a lug 397 on the dog and hold it against the action of spring 395. This latch has a spring 398 attached to it tending to constantly rock it out of the path of the lug 397. This tendency is prevented by a second pivoted latching lever 399 having one arm engaging the top of lever 396 and holding it in latching position and another arm on which is supported the armature 400 of a magnet 50. A spring 401 biases the lever 399 to latching position. The disc 392 and shaft 103 are held in normal home position by the latch lever 396 and another latch 404 engaging a stop pin 405. The latch lever 396 also engages one arm of a bell crank 406 which through an insulating bail 407 closes a pair of spring contacts. The clutch is operated by energization of the magnet 50 which attracts its armature 400 and rocks the latch 399 out of latching position. The spring 398 thereupon rocks latching lever 396, which releases the dog 393 and permits the nose portion 394 to engage in the notch 403. The disc 392 and shaft 103 then rotate with the disc 391 effecting card feed in the usual manner. Incidentally the rocking of latch lever 396 releases the bell crank 406 and permits the contacts M—5 to open due to their own resiliency.

The card feed shaft continues to rotate as long as the magnet 50 is energized once every cycle to prevent relatching of the disc 392. If this magnet fails to energize at the proper point in any cycle the clutch will disengage at the end of the cycle when it reaches home position. The stop pin 405 once each revolution engages a cam arm 410 integral with the latch lever 396 and rocks the latter into latching position. This has no effect on the clutch as long as the magnet is energized at the proper time as the lever 399 is then rocked to release the latch 396 which is returned to unlatching position by its spring 398 before the dog reaches the position in which its lug 397 can engage the latch. If the magnet 402 is not energized at the proper point in the cycle the latch lever 396 remains in latching position and the lug thereon catches the projection 397 on dog 393 and releases it from the notch 403, thereby unclutching the discs and arresting card feed at the end of the cycle. It will be noted that this unclutching operation, no matter when it is initiated, can only become effective at the end of a cycle so that the card feed shaft always rotates for one or more complete revolutions. When the discs come to rest rebound is effectively prevented by the coaction of locking lever 404 with stop pin 405.

The machine is driven by an electric motor 10 which is energized from the mains 11 and 12 through a manual switch 13. The motor when operating drives the several operating shafts of the machine to which the several machine elements are connected or clutched under electric controls as required by the machine operation. The upper brushes 14 and the lower brushes 15 are energized from the main 11 through contacts 16, closed momentarily by a dentated cam for each index point position, and card feed contacts 17 which are closed during the adding portion of each card feeding cycle and opened at other times by a suitable cam on the card feed shaft. Beyond the contacts 17 the brush energizing circuit branches, one branch extending to the upper brushes 14 through upper card lever contacts 18 and the other branch extending to the lower brushes 15 through the lower card lever contacts 19. The upper brushes coact with individual contact plates 20 which are connected to individual sockets 21 on the main plug board 22 and the lower brushes 15 coact with individual contact plates 23 connected with individual sockets 24 on the main plug board.

The accumulator elements represented at 28 are individual to denominational orders and each is provided with a counter magnet 27, energization of which clutches a suitable counter element to the tabulating shaft which is driven constantly by the motor 10. Each counter magnet 27 is connected to a double socket 29 on the board 22 from which it may be plugged through the adding and listing switch bar 35 to any lower brush for accumulating. The printing mechanism represented by the call magnets 25 may be of the rotary drum type disclosed in the copending application which consists of a constantly rotating drum having a plurality of rows of pivoted type carriers thereon which are carried successively through printing position and which will be selected for printing by energization of the call magnets 25. These magnets are connected to sockets 26 on the plug board from which they may be selectively connected through the adding and listing switch bar 35 to any of the lower brushes 15 for listing and through the total print switch bar 36 to the totaling contacts 37 of the accumulating elements 28.

After the motor 10 is in operation card feed may be instituted by depressing the start key ST whereupon a circuit will be completed from the main 11 through the card feed contacts CF9 and start key contacts to the starting coil 45 of the D timer or the starting coil 46 of the E timer. If there is no card under the upper brushes the upper card lever 47 will be in the position shown in the drawing, closing contacts 48 and opening contacts 49. Under these conditions the D timer starting coil will be energized. If there is a card under the upper brushes at the time the start key is depressed the lever 47 will be shifted to an alternative position opening the contacts 48 and closing the contacts 49, in which case the E timer starting coil 46 will be energized. These timers consist of cam controlled contacts which close in predetermined sequence during certain initial machine cycles when the timer is started and their function is to keep the card feed in operation until the first card reaches the lower brushes, after which machine control is assumed by the usual automatic control circuit. One or the other of these timers being started by the energization of its starter coil, a circuit will be established during the necessary number of initial cycles through the card feed clutch magnet 50, this circuit extending from main 11 through timer contacts E2 or D2 to wire 51 and through cam contacts 52 closed at the proper time in each cycle to the card feed clutch magnet 50 and thence through common return 53 to the other main 11. Energization of the card feed clutch magnet 50 at the proper time in each cycle causes the one revolution card feed clutch 55 to engage, whereupon the record cards are fed successively beneath the upper and lower brushes 14 and 15. Each card passes between the brushes and their coacting contact plates 20 or 23 to hold the brush circuits extending to the plug board 22 open in the absence of perforations in the cards and to permit these circuits to be closed momentarily to control accumulating and listing whenever the brushes encounter index point perforations.

The automatic control system, which maintains the card feed mechanism in operation through successive machine cycles as long as certain controlling perforations on cards under the upper and lower brushes agree, is of the type shown in the copending application of Smith, Serial No. 185,718 filed April 22, 1927. It consists of a pair of control magnets 56 and 56a for each record controlling column. One magnet 56 of a pair may be connected to the upper brush cooperating with a control column and the other magnet 56a of the pair may be connected to the corresponding lower brush. Each pair of control magnets is provided with a pair of contacts 57 so arranged that they are normally closed and will remain closed if neither of the magnets is energized or if both magnets are energized simultaneously but will open if either magnet of the pair is energized without concurrent energization of the other. Each of the contacts 57 terminates in a socket so that any number of them may be plugged in series in the automatic control circuit 58. Automatic control is indicated in the drawings for the left hand upper and lower brushes which are plugged to the left hand pair of control magnets 56 and 56a respectively. The corresponding automatic control contacts 57 are wired in series with the card feed clutch magnet 50 through the regular cam contacts 59 which close once each cycle.

When the first card reaches the lower brushes the control of the card feed clutch magnet shifts from the starting timers to the automatic control circuit, the magnet circuit now extending from main 11 through wire 58 contacts 57 and cam contacts 59 to card feed clutch magnet 50 and thence through common return 53 to the other main 12. As long as the controlling perforations in the cards under the upper and lower brushes agree, the contacts 57 remain closed, the clutch magnet 50 is energized each cycle and card feed continues. As soon as the controlling perforations fail to agree on cards under the upper and lower brushes, one of the magnets 56 and 56a is energized without concurrent energization of the other at some time during the cycle and the contacts 57 open and remain open until towards the end of the cycle. The automatic control circuit is thus opened and the closure of contacts 59 fails to cause energization of clutch magnet 50, whereupon card feed clutch 55 disengages at the end of the cycle and card feed ceases.

The card feed clutch on disengaging closes a contact M—5 and the total timer F may now be started into operation by depressing the total key T to close contacts 60. This closes a circuit through the starting coil 61 of the total timer extending as follows: From main 11 through total contacts 60, regular cam contacts 62 and contacts M—5 to starting coil 61 and thence to the other main 12. The total timer closes its cam contacts in proper sequence to control machine operation during the several totaling cycles. In one of these cycles the contact F—7 closes and causes energization of the jack magnet 63 of the total and reset switch bar 65 and likewise causes energization of the jack magnet 64 of the total printing switch bar 36. These bars both move to circuit closing position and the former through the regular cam contacts 66 supplies a starting pulse to the counter magnets of any of the accumulators which are plugged to this switch bar thus causing the accumulators to reset. The accumulator elements on reaching home position close totaling contacts 37 and may effect total printing through any of the printing call magnets 25 which are plugged to the total printing switch bar.

The operations and machine elements thus far explained and described form per se no part of the present invention and are fully described and claimed in the copending applications above referred to. It has heretofore been customary to plug the counter magnets 27 of the accumulators to the lower analyzing brushes 15 through the adding and listing switch bar 35 so that items recorded on different card fields are entered into different accumulators. The present machine is provided with two additional switch bars A and B which are controlled by jack magnets 70 and 71. These jack magnets are similar to those controlling the total switch bars and energization of them at any time during a machine cycle causes a one revolution clutch to engage at a predetermined point in the cycle. The timing is so arranged that if the magnets are energized during one machine cycle the clutches will engage at the proper time to move the A and B switch bars to circuit closing position during the entering portion of the next machine cycle. Certain accumulator counting magnets 27 may be plugged to selected lower brushes 15 through the A bar and the jack magnet 70 of this bar may be plugged to the corresponding upper brushes 14. The same counting magnets 27 may also be plugged to other lower brushes 15 through the B bar and the jack magnet 71 may be plugged to the upper brushes corresponding to these lower brushes. Then as each card passes the upper brushes those brushes which encounter perforations in one card field will energize the selected jack magnet 70 or 71 causing either the A or B switch bar to move to circuit closing position during the following machine cycle thus automatically connecting the counter magnets to the proper lower brushes to receive the entry.

The circuit diagram in the drawing indicates plugging for connecting the counter magnet of the upper accumulator 28 to the middle lower brush 15 through the A switch bar and for connecting the same accumulator 28 to the right hand lower brush 15 through the B switch bar. The jack magnet 70 controlling the A bar is connected to the middle upper brush 14 and the jack magnet controlling the B bar is connected to the right hand upper brush. In this case it has been assumed that each card field consists of a single card column but it will be understood that either field might consist of any number of columns in which case one accumulator element would be used for each column. It should also be borne in mind that under the present system items on a single card will be entered in one only of the two card fields, even the usual zero punching being omitted in the other. Now as each card passes the upper brushes either the middle brush or the right hand brush will encounter an index point and energize the corresponding jack magnet 70 or 71 whereupon the proper A and B switch bar will move to circuit closing position during the following machine cycle and the item will be entered by the lower brushes into the accumulator. During this entry the succeeding card is passing the upper brushes and will selectively energize the jack magnets 70 or 71 to determine the closure of the A or B switch bar in the following cycle whereupon the entry on this card will be entered into the accumulator when the card reaches the lower brushes. Thus although the items are recorded on two different card fields they are entered into the same accumulator whereby a single total of all items is obtained.

The invention has now been explained in connection with one specific embodiment but it will be understood that many modifications will readily occur to those skilled in the art which will not depart from the spirit of the invention. For example, while provision has been made for selecting between only two card fields it is obvious that any number of fields could be handled in the same way by the simple addition of switch bars. Also although the perforations indicating items have been used in the present case for controlling the selective switch bars it is evident that special identifying perforations could be used for this purpose which might or might not be placed on the same card fields with the item designating perforations. The invention is intended to be limited therefore only as indicated by the scope of the following claims.

What is claimed is:

1. In a record controlled accounting machine, an accumulating device, a plurality of record controlled entering devices and record controlled means for selectively connecting the several entering devices one at a time with said accumulating device.

2. In a record controlled accounting machine, an accumulating device, a plurality of record controlled entering devices each cooperating with a different record field and means controlled by said records in accordance with the presence of data designations in the fields for selectively connecting the accumulating device to the entering devices cooperating with the fields in which data designations occur.

3. In a record controlled accounting machine, an accumulating device, a plurality of groups of record analyzing devices each group cooperating with a different record field, means for selectively associating the several groups of analyzing devices one at a time with said accumulating device and record controlled means for operating said last named means prior to the analysis of the record by the analyzing means.

4. In a record controlled accounting machine, an accumulating device, a plurality of groups of record analyzing devices each group cooperating with a different record field, means for selectively associating said accumulating device with the several groups of analyzing devices and means responsive to index points on the records for operating said last named means prior to the analysis of the record by the analyzing means.

5. In a record controlled accounting machine, an accumulating device, a plurality of groups of record analyzing devices each group cooperating with a different record field, means for selectively associating said accumulating device with the several groups of analyzing devices and means responsive to data designations in the several fields for operating said last named means prior to the analysis of the record by the analyzing means to associate the accumulating device with analyzing devices cooperating with the record fields in which data designations occur.

6. In a record controlled accounting machine, an accumulating device, a first set of analyzing devices, a second set of analyzing devices consisting of groups each coacting with a different record field, means for feeding records to said sets of analyzing devices successively and means controlled by said first set of analyzing devices in response to index points on records to selectively connect the accumulating device to the groups of analyzing devices of the second set coacting with record fields in which data designating index points occur.

7. In a record controlled accounting machine, an accumulating device, a first set of analyzing devices consisting of groups each coacting with a different record field, a second set of analyzing devices consisting of groups coacting with corresponding record fields, means for feeding records to said sets of analyzing devices successively and means controlled by said first set of analyzing devices in response to data designating index points for selectively connecting the accumulating device to the groups of analyzing devices in the second set coacting with record fields in which the data designating index points occur.

8. In a record controlled accounting machine, an accumulating device, a set of upper analyzing brushes and a set of lower analyzing brushes, switching means for selectively connecting said accumulator to different lower brushes and electromagnet means controlled by said upper brushes for operating said switching means.

In testimony whereof I hereto affix my signature.

FRED M. CARROLL.